Jan. 9, 1962

R. E. OCHS, JR 3,015,951

POINTER MECHANISM

Filed Dec. 20, 1956

INVENTOR.
ROBERT E. OCHS JR.
BY
*Arthur H. Swanson*
ATTORNEY.

United States Patent Office 3,015,951
Patented Jan. 9, 1962

3,015,951
POINTER MECHANISM
Robert E. Ochs, Jr., Oreland, Pa., assignor to Minneapolis-Honeywell Regulator Company, Minneapolis, Minn., a corporation of Delaware
Filed Dec. 20, 1956, Ser. No. 629,540
15 Claims. (Cl. 73—141)

The present invention relates to pointer mechanisms for measuring and indicating the magnitude of a variable. Such pointer mechanisms have heretofore employed pinions in mesh with gear segments and other similar mechanisms to obtain high gain or large incremental motion across an indicating scale for each change in the magnitude of a variable being measured. It is the object of the present invention to employ a greatly simplified pointer actuating mechanism in the form of a bowed flexure strip to perform such a high gain pointer actuating function.

More particularly, the present invention comprises a novel bowed flexure strip actuating mechanism for transforming the magnitude of a small force applied to a beam into a very large motion of a pointer by making use of the movement of a portion adjacent an end of such a strip to arcuately move the pointer attached thereto across a force indicating scale.

My invention is characterized in particularly by the fact that the novel, simple, and effective bowed flexure strip actuating mechanism which I have devised is used to greatly amplify the deflection of a pointer for each incremental change in the deflecting force applied to the aforementioned beam. A more specific object of the present invention is thus to provide a mechanism which will directly transform such a small incremental change in the magnitude of a force, that is applied to a beam, into a very large proportional arcuate movement of a pointer of an indicating instrument.

Another object of the present invention is to provide substantially frictionless pivots for each end of the aforementioned flexure strip so that practically the entire amount of force being transmitted by the beam will be transmitted in the form of motion through the high gain flexible strip to the pointer.

A better understanding of the present invention may be had from the following detailed description when read in connection with the accompanying drawings, in which.

Figure 1:
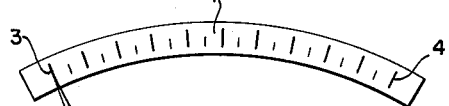
FIG. 1 is an elevation illustrating one desirable embodiment of the invention.
Figure 2:
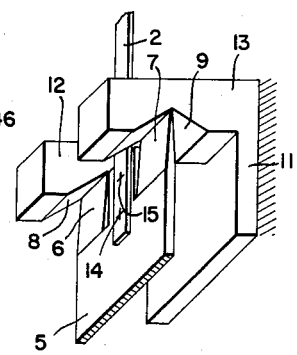
FIG. 2 illustrates one way by which the pointer shown in FIG. 1 may be attached to the bowed flexure strip shown in this figure.

The embodiment of the present invention shown by way of example in FIG. 1 includes a curved stationary scale 1 along which the free end of a pointer 2 moves between the zero and the maximum end portions 3 and 4 of the said scale. The free end of the pointer 2 is subjected to a variable deflecting force by a curved flexible member 5 which may be made of any material that has a high resistance to permanent set, for example, beryllium copper. The end of the member 5 adjacent the element 2 has tapered knife edge end portions 6 and 7 which extend respectively into engagement with, but does not fill the notches 8 and 9 in a stationary supporting element 11. This stationary member 11 may be fixedly attached to any suitable immovable structure as is indicated by the cross hatching in FIG. 2 of the drawing. FIG. 2 also shows element 11 as having a first lug portion 12 containing notch 8 therein and a second lug portion 13 containing the notch 9 therein. The lower end of the pointer 2 is shown in FIG. 2 protruding through the space between these lug portions 12 and 13 and fixedly attached at 14 and 15 by any suitable means, for example, by means of welding material, to a portion adjacent the end of the flexible bowed strip 5. The end of the flexible strip 5 remote from the pointer 2 has a tapered knife edge end portion 16 extending into a notch 17 in the movable end of the beam 18.

As shown in FIG. 1 the end of the beam 18 remote from the element 5 is connected to a stationary support 19 by a transverse flexible element 21. The latter may well be a metal leaf spring having one end rigidly attached to and extending in a generally perpendicular direction away from the adjacent end of the beam element 18. As shown, the element 21 is rigidly attached to the adjacent end portion 22 of the beam 18.

As shown by way of example in FIG. 1, the member 5 is slightly flexed, the member 18 not flexed, and the free end of the pointer 2 is in register with the zero end 3 of the indicating scale 1. The beam 18 is substantially rigid and may be deflected from zero position, shown in FIG. 1, by a regulatable pressure force applied to the force element 23 or any other type of mechanism which is commonly used to apply a force of varying magnitude to a beam. The force so applied to the beam 18 is shown as acting upward against the underside of the beam. This beam 18 may be deflected toward the notches 8 and 9, shown in FIG. 2, by the application to the beam of a regulatable pressure force operative to decrease the distance between the end portions 6, 7 and 16 of the bowed flexure strip 5.

In the force element 23, shown in FIG. 1, the end of the beam 18 adjacent the member 5 is adapted to deflect in the direction to shorten the distance between the ends 6, 7 and 16 of the member 5. The extent of deflection of the pointer 2 along the indicating scale 1 between its ends 3 and 4 increases in a linear manner with respect to the effective force applied by way of the force applying member 23 through beam 18 to end portion 16. In operation, when the deflection of the free notched out end of the beam 18 is increased due to an increase in the force applied to the beam by member 23, the distance between the ends 6, 7 and 16 of the flexure strip 5 is decreased. As previously stated, the degree to which the end members 6, 7 and 16 of the flexible strip 5 are brought together will depend on the magnitude of force that is applied to the input member 23. This input force as is schematically shown in FIG. 1 of the drawing may be due to a pressure of varying magnitude that is proportional to a variable that is flowing through the conduit 25 into the pressure chamber 26. If such a pressure is increased it will move the diaphragm 27 and the discs 28, 29 that retain the input force member 23 in fixed engagement with the diaphragm 27 in an upward direction.

A span adjusting means may also be provided for the pressure actuated chamber member 26 in the form of a stationary rail member 31 along which a lower portion 32 of the pressure chamber 26 is slidably mounted. This span adjusting means as is shown in FIG. 1 of the drawing also includes a manually adjustable screw 33 that is threadedly mounted in a portion 34 that protrudes upwardly and is fixedly attached to the stationary member 31. The other end of this screw 33 is connected by means of a swivel 35 to the outer wall of the chamber 26. With this arrangement adjustment of the screw 33 will enable the pressure chamber 26 and the input force member 23 attached thereto to be moved toward or away from the stationary member 19. In this way the moment arm about the stationary support 19 that the input force member 23 is applying a force to the beam 18 may be varied.

FIG. 1 also shows an over travel stop 36 for the beam 18. The purpose of this stop is to limit the upward movement of the beam to such a motion that will enable an upward force to be transmitted by input force member 23 to the beam 18 to bow the member 5 so that the motion of the pointer 2 will not be caused to move beyond the end 4 of the indicating scale 1. In a like manner the bowed strip 5 may be prevented from dropping out of engagement with members 12 and 18 by the provision of a stop 24 under the beam 18.

Figure 3:
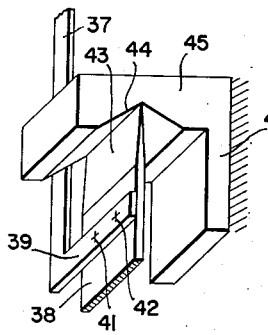
FIG. 3 shows an alternative way of attaching the pointer shown in FIG. 1 to the bowed flexure strip that is also shown in this figure.

FIG. 3 illustrates a desirable modification of the apparatus shown in FIG. 1 in which there is shown a pointer 37 and an upper end portion of a flexible bowed member 38 which may be substituted for the pointer 2 and the bowed member 5 shown in FIGS. 1 and 2. The lower portion of this pointer 37 is formed with a transverse end portion 39 which bears against and may be welded at 41 and 42 to the bowed flexure strip 38 as shown. FIG. 3 also shows the upper end of this strip with a tapered knife edge end portion 43 that is in engagement with a notched out portion 44 in the extending lug member 45 of the stationary member 46.

The operation of the pointer actuating mechanism as shown in FIGS. 1, 2, and 3 depends on, and is a function of, the degree to which an input force member, such as the member 23, varies the distance between the two ends of the flexible bowed strip 5 or 38. The invention is also advantageously characterized by the relatively small angular movement that is necessary for the beam to make in order to procure large arcuate movements of the pointer. This high gain in pointer motion is brought about because the pointer 2 is attached close to the upper end portion of the flexible member 5 where experimentation has shown a maximum amount of bending of the member takes place for each increasing increment of force that is applied by the input member 23 through the beam 18 to the member 5. During the aforementioned bowing action of the flexure strip 5 in which the ends of bowed member 5 are brought toward one another, it will be noted that the central portion of this flexure strip is always retained at an equal distance from the ends 6 and 16 and that it will be caused to move along a straight line that is substantially normal to a line passing through the tapered ends of this flexure strip. In FIG. 1 the lower half portion of this flexure bowed strip that is below the aforementioned central portion may therefore be described as one end of a cantilever beam that is constantly adjusting its stationary pivot at this end in a direction from the solid line position toward the dotted line position of the strip shown in FIG. 1 as the input force that is applied to the strip is increased. It can therefore be seen that because the central portion of the bowed flexure strip acts as a supporting end of a cantilever beam whose position may be altered and because the upper end of this strip 5 cannot be moved in an upward direction while the aforementioned bowing action of the strip 5 takes place, the pointer attached end portion of this strip 5 will thus realize a great deal of radial displacement about the pivot 12 during each small change in the magnitude of the input force. The amount of displacement that the pointer attached portion of the strip 5 will realize will thus depend on the amount of bending taking place in the upper half portion of the strip 5. It can also be seen that as the magnitude of the force being applied by the input force member 23 to the beam 18 is increased it will cause the center of the bowed strip 5 to move in a straight line toward the left or in other words to move in a direction in which the bowing action is taking place. This action in turn will cause the portion of the strip that is attached to the pointer to be bent and angularly displaced about the stationary portion 8 of the pivot 6, 8.

If, on the other hand, the magnitude of the aforementioned beam actuating force is decreased an action opposite to that already described will take place and the portion of the strip that is attached to the pointer will be caused to move in a direction toward this initially slightly bowed position. The rate and amount to which the strip 5 will be moved toward such a slightly bowed position will, of course, depend on the rate and the magnitude to which the force of the force member 23 is being reduced.

Figure 4:
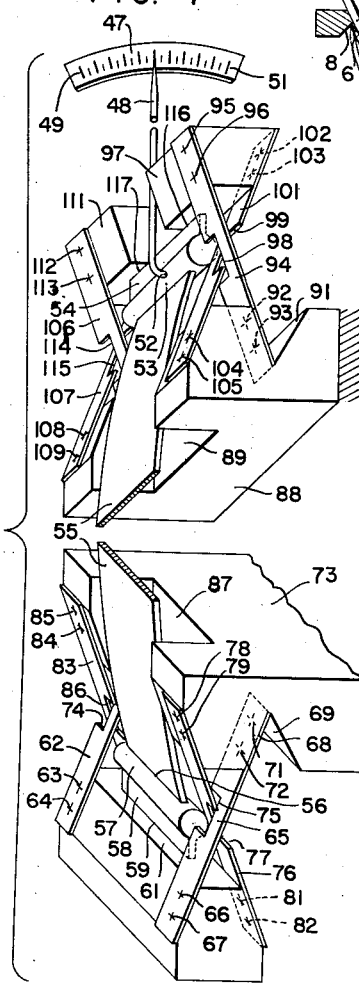
FIG. 4 is an elevation illustrating another or preferred embodiment of the invention.

In the preferred or FIG. 4 embodiment of the invention there is shown a curved stationary indicating scale 47 along which the free end of a pointer 48 moves between the zero and maximum end positions 49 and 51 of the scale. The free end of the pointer 48 is fixedly connected as shown at its lower portion 52 to a central part of a cylindrical member 53. The upper portion of the member 53 has, in turn, fixedly attached thereto, a rectangularly shaped non-flexible member 54 and the lower surface of the cylindrical member 53 is fixedly attached to the upper end portion of a bowed flexure strip 55. The lower end 56 of the flexure strip 55 is connected to a second cylindrical member 57. The cylindrical member 57 in turn is fixedly connected to a second rectangular non-flexible member 58 at the lower surface of the cylindrical member 57. A lower surface 59 of the rectangular member 58 is shown fixedly attached to a non-flexible hexagonal block 61. To the left side portion of this block 61 there is shown a flexible strip 62 that is attached to this portion of the block by suitable connecting means 63, 64. In a similar manner there is also shown a flexible strip 65 connected to this side of the block 61 by way of the connecting means 66, 67. The upper end of this flexible strip 65 extends into and is attached to a side wall portion 68 of the notched out recess 89 by means of any well known suitable connection 71, 72. The member 73 shown in FIGURE 4 of the drawings to which the flexible strip 65 is attached may be supported and actuated in the same manner as the beam 18 shown in FIG. 1 at the end of the beam member 73 that extends away from the broken away portion shown in FIGURE 4. The flexible strip 62 is shown as having a cut away portion 74. The flexible strip 65 is also shown having a cut away portion 75 which overlaps and is spaced from the flexible strip 76. The flexible strip 76 also has a cut out portion 77 and an upper end fixedly attached by suitable connecting means 78 and 79 to the left end of the beam member 73 and its lower end connected by suitable connecting means 81, 82 to the hexagonal block 61.

There is also shown in FIG. 4 of the drawing another flexible strip 83 which is constructed and attached in a similar manner to that of 76. This flexible strip 83, for instance, is connected at its upper end by suitable connecting means 84, 85, and at its lower end it is connected to the hexagonal block 61 in a manner similar to the way the strip 76 is connected at 81 and 82. The central portion of the strip 83 has a notched out portion 86 which overlaps the notched out portion 74 in the flexible strip 62. The non-pivot end of the beam 73 shown in FIG. 4 of the drawing contains a slotted out end portion 87. The upper stationary block 88 also contains a similar recessed portion 89 in which the bowed flexure strip 55 may move when a force is applied to the underside of the beam 73. The upper stationary block 88 is shown having a notch 91 cut therein to one side wall portion of which there is attached, by suitable connecting means 92, 93, a flexible strip 94. The upper end of the flexible strip 94 is connected, by way of suitable connecting means 95, 96 to the side portion of a block 97. This flexible strip 94 contains a notched out portion 98 that overlaps a similar notched out portion 99 that is in a flexible member 101. The flexible member 101 is connected to the block 97 by suitable connecting means 102, 103 at its upper end and to the stationary member 88 by means of the connecting means 104, 105 at its lower end. While not shown in its entirety in FIG. 4 of the drawing, there is a pair of flexible members 106, 107 which are positioned and attached to the stationary member 88 in a manner similar to that shown for the flexible members 94, 101. For example, the strip 107 is shown attached by a suitable connecting means 108, 109 to the rear side portion of the stationary member 88. The upper end of these members 106, 107 are attached to the block 111 in a manner similar to the way the upper end of the flexible strips 94 and 101 are attached to the block 97. For example, the upper end of the strip 106 may be attached by suitable connecting means 112 and 113 to the block 111. The flexible strip 106 and 107 also contain overlapping spaced apart notched out portions 114, 115. A lower surface portion 116, 117 of the blocks 97, 111 are shown fixedly attached to the upper surfaces of the non-flexible rectangular member 54.

From the aforementioned description of the detailed parts shown in FIG. 4 of the drawings, it is thus evident that FIG. 4 shows a way in which a flexible pivot arrangement may be substituted for the knife-edge pivot arrangement shown at the extreme ends of the flexure bowed strip 5 shown in FIG. 1 of the drawings.

In the operation of the pointer mechanism as shown in FIG. 4, an input force is applied to the underside of the right end portion of the beam 73 by way of a force input member such as the input member 23 already set forth under the description of FIG. 1. As this input force acts to move the beam 73 in an upward direction the flexible members 62, 65, 76, and 83 attached thereto will likewise tend to be moved in an upward direction with the beam 73. As this upward beam movement takes place, the hexagonal block 61 that is attached to the lower portions of these flexible strip members, the rectangular strip 59 the cylindrical member 57 and the lower end 56 of the bowed flexure strip 55 that is attached to the cylindrical member 57 will likewise be moved with the beam 73 in an upward direction. As this upward beam movement takes place, the upper flexure strips 94, 101, 106, and 107 that are connected to the stationary block 88 at their lower end will prevent the upper end of bowed flexure strip 55 from moving the cylinder 53 and pointer 48 attached thereto in an upward direction. Since the bowed flexure strip 55 is already in a slightly bowed condition when the pointer 48 is at the lowest indicating portion 49 of the scale 47, and since the upward movement of beam 73 at this time cannot cause the upper end of the bowed member 55 to move in an upward direction, the bowed member will therefore be caused to move from such a slightly bowed condition to a position such as that shown in FIG. 4.

During the movement of the flexure member from the minimum scale reading 49 to the indicated pointer reading 48 shown in FIG. 4 the movement of the beam 73 in an upward direction will cause the central axes of the cylindrical member 57 and 53 to be drawn closer together. As this drawing together of the central axes of the cylindrical members 57 and 53 takes place the upper cylindrical member 53 will be caused to rotate in a clockwise direction about the center of the flexible pivots 94, 101, 106, and 107 on which it is mounted by way of the members 54, 111, and 97. As such rotation of the cylindrical member 53 takes place, the pointer 48 which has a portion 52 attached to one portion of this cylinder will likewise be moved in a clockwise direction from its initial position on the indicating scale at 49 to the position shown in FIG. 4. Any further increase in the input force applied to the lower side of the beam 73 will cause the flexure member 55 to be moved to a greater bowed position and cause the cylindrical member 53 to be further rotated in a clockwise direction about its flexible pivot mountings. As this action takes place the pointer 48 will be moved from the position shown in FIG. 4 toward the upper end 51 of the scale 47.

In a similar but reverse manner it can be seen that a reduction in the force being applied to the underside of the beam will permit the bowed flexure member 55 to be moved back toward its slightly bowed position and the cylindrical member 53 to be rotated in a counter-clockwise direction so that the pointer may be moved downscale.

The FIG. 4 or preferred embodiment of the invention is similar to the instrument shown in FIG. 1 in that the end of the pointer is attached to an end portion of a flexure member that is caused to be moved from a slightly bowed position to a much greater bowed position. FIG. 4 therefore possesses all of the high gain pointer moving advantages as those previously pointed out under the description of FIG. 1. Beside this high gain advantage the mechanism shown in FIG. 4 has a further advantage in that the pointer 48 and the cylindrical member 53 may have a rotary motion transmitted to them by way of the bowed flexure member 55 without introducing any friction in the parts that transform the force acting on beam 73 into pointer motion.

What is claimed is:

1. A mechanism for measuring and indicating the magnitude of a variable, comprising an elongated bowed flexure member, a first substantially frictionless flexible pivot means between a first end of said elongated member and a stationary block, a second substantially frictionless flexible pivot means between the opposite end of said member and a force applying means, a pointer connected to and extending away from a portion of said first mentioned end of said member, and said force applying means when applying a force in one direction acting to cause said two ends of said member to be moved toward one another and said pointer to move in an upscale direction along an indicating scale and said force applying means when applying a force in the opposite direction acting to cause said two ends to be moved away from one another and said pointer to be moved in a downscale direction along said indicating scale.

2. A substantially friction-free pointer mechanism for measuring and indicating the magnitude of a variable force, comprising a curved flexure element, a deflecting pointer having one of its ends connected to a first elongated end portion of said flexure element for movement therewith, a fixed axis about which the first end portion of said flexure element can be rotated, said flexure element having an opposite second elongated end portion that extends away from said axis in a predetermined direction, a flexible pivot element connected to the second elongated end portion of said flexure element, a beam positioned transverse to said predetermined direction and having one end connected for movement with the flexible pivot element, means to move said beam end toward and away from said fixed axis thereby effecting a change in the distance between the ends of said flexure element which produces a bending of said flexure element, and a bendable element connecting the second end of said beam to a beam supporting member.

3. The combination as defined in claim 2 including means laterally engaging said beam at a point intermediate its ends to apply a force of varying magnitude thereto to afford a means of holding the end of the beam adjacent said flexible element in snug engagement with said flexure element.

4. A substantially friction-free pointer mechanism for measuring and indicating the magnitude of a variable force, comprising a vertically movable beam, an angularly adjustable pointer movable along a curved path, a bowed flexure strip having one of its ends connected by means of a flexible pivot to said beam and its opposite end connected to a stationary pivot member, means connecting a portion immediately adjacent the stationary pivot end portion of said strip with a non-indicating end of said pointer, and said beam being adapted to be moved by a force applied thereto from a first predetermined position toward a second predetermined position and to thereby effect a movement of the flexure strip end which is connected to the flexible pivot in a direction towards said stationary pivot while the opposite end of said flexure strip pivots about said stationary pivot member.

5. Apparatus as defined in claim 4 in which said bowed flexure strip is forced from a partially bowed position toward a fully bowed position as said force applying means acting on said beam moves said beam between said two positions.

6. In combination, a flexible curved element, a pointer of L-shaped configuration having a non-indicating end attached to and protruding from a first cylindrical member whose central portion is fixedly connected in a transverse direction to one end of said element, said pointer having an indicating end that is normal to and protrudes from said non-indicating end and which is deflectable along an arcuate path, a second cylindrical member connected to the opposite end of said element, and a first cross-spring flexible pivot connected by way of said first cylindrical member to the end of said curved element which is located adjacent the non-indicating end of the pointer, a second cross-spring flexible pivot connected by way of the second cylindrical member to the opposite end of said curved element, said second cross spring flexible pivot providing a means through which a force can be applied without any substantial friction loss to move said second cylindrical member in a vertical direction while simultaneously varying the rotary motion of said first cylindrical member and said pointer protruding therefrom.

7. The combination with a curved bendable bowed member, of a cylindrical member attached to one of the outer-most ends of said member, a flexible substantially frictionless cross-spring pivot operably positioned between said member and a stationary block to rotate said cylindrical member about its longitudinal axis, an elongated pointer of substantially cylindrical cross section having a non-indicating end portion fixedly attached to and projecting at right angles from a peripheral portion of said cylindrical member, an indicating end for said pointer, projecting at right angles away from said longitudinal axis of said non-indicating portion and means for bending said bowed member to thereby cause said pointer to rotate in a predetermined manner about the longitudinal axis of said cylindrical member.

8. In combination, a curved flexure element, a deflecting pointer having its extreme end portion in contact with the peripheral surface of a first cylindrical member which is attached to one end of said element, a first substantially frictionless flexible pivot on which said cylindrical member can be rotated, said flexure element having a portion attached to said member at one end which extends away from said pivot in a predetermined direction and being attached to a second cylindrical member at its other end, a beam transverse to said direction and having one end in engagement with a second substantially frictionless flexible pivot which is attached to said second cylindrical member, and means for moving said beam and said second cylindrical member toward and away from said pivot of said first cylindrical member to rotate said first cylindrical member about the axis of said first pivot.

9. A combination as defined in claim 8 including means positioned to engage said beam at a point intermediate its ends to maintain an initial force on the connection between the second flexible pivot and said second cylindrical member.

10. In combination, a flexible curved element, a cylindrical member connected to one end of said curved element, a pointer having a portion of its outer peripheral surface fixedly attached to and protruding from a portion of the peripheral surface of said member and having a second end deflexable along an arcuate path, a first flexible substantially frictionless pivot connecting said member to a stationary block and means subjecting said curved element to a variable curvation whereby the free end of said pointer is caused to move along said arcuate path as its attached end rotates about the longitudinal axis of said cylindrical member.

11. A linear motion to a radial motion transducing apparatus, comprising a beam displaceable by a force in a direction that is perpendicular to the longtiudinal axis of the beam, an elongated bowed flexure strip having one elongated end portion operably connected by way of a substantially frictionless flexible pivot to the bottom portion of said beam, a cylindrical member attached along a side portion thereof to the opposite end of said bowed flexure strip, another substantially frictionless flexible pivot operably connected to said cylindrical member about the central axis of which said member and said opposite end of said bowed flexure strip attached thereto is caused to rotate when said beam is displaced in said perpendicular direction, a rigid pointer connected at one of its ends to a peripheral surface of said cylindrical member and the portion between the ends of said pointer being operably moved about the axis of said cylindrical member across an indicating scale in a radial fashion during the occurrance of said rotation of said cylindrical member about the center axis of its said associated pivot.

12. Apparatus as defined in claim 11 in which an incremental increase or decrease in said force being applied to said beam to cause said displacement of said beam will result in a uniform incremental radial movement of said pointer across said indicating scale and wherein said substantially frictionless flexible pivots and said rotatable cylindrical member on the extreme end of said strip is operably positioned to afford the converting of said displaceable force applied to said beam into said pointer motion in a substantially frictionless manner.

13. In combination, a beam operably connected to be displaced by a force in a direction that is perpendicular to the longitudinal axis of said beam, an angularly displaceable pointer movable along a curved path, a bowed flexure means operably connected to said beam at one end by means of a substantially frictionless flexible pivot, the opposite extreme end of said bowed flexure means being connected by means of a cylindrical member to a second substantially frictionless flexible pivot and a non-indicating end of said pointer being operably connected to a rotatable surface of said cylindrical member to move said pointer toward one or the other end of said curved path as the beam is moved in said direction away from or toward said opposite extreme end of said bowed flexure means.

14. In combination, a beam operably connected to be displaced by a force in a direction that is perpendicular to the longitudinal axis of said beam, an angularly displaceable pointer having one end positioned to be moved along a curved path, a bowed flexure strip, a cylindrical member having a portion of its peripheral surface connected to one extreme end of said strip, another cylindrical member having its peripheral surface connected to the other extreme end of said strip, said first-mentioned cylindrical member having another portion of its peripheral surface connected to a flexible substantially frictionless pivot which is attached to said beam, said other cylindrical member having another portion of its peripheral surface connected to another flexible substantially frictionless pivot which is attached to a stationary block, means connecting the other extreme end of said pointer to a third peripheral portion of the last-mentioned cylindrical member, and force applying means acting on said beam to move it from a first predetermined position toward a second predetermined position and cause the last-mentioned cylindrical member to rotate said pointer about the center of rotation of its associated pivot.

15. Apparatus as defined in claim 14 in which said bowing of said flexure strip from a partially bowed toward a fully bowed position will cause the center of said cylindrical members to move relevant to one another as said force applying means acting on said beam moves said beam toward said two positions.

References Cited in the file of this patent

UNITED STATES PATENTS

| | | |
|---|---|---|
| 849,418 | Nickerson | Apr. 9, 1907 |
| 1,983,486 | Paulin | Dec. 4, 1934 |
| 2,208,635 | Johnson | July 23, 1940 |
| 2,536,198 | Matner | Jan. 2, 1951 |

FOREIGN PATENTS

| | | |
|---|---|---|
| 216,538 | Great Britain | July 30, 1925 |
| 550,858 | Great Britain | Jan. 27, 1943 |